(12) United States Patent
Venkatasurya et al.

(10) Patent No.: US 11,713,502 B2
(45) Date of Patent: Aug. 1, 2023

(54) METHOD FOR PRODUCING A HIGH STRENGTH STEEL SHEET HAVING HIGH DUCTILITY, FORMABILITY AND WELDABILITY, AND OBTAINED STEEL SHEET

(71) Applicant: ArcelorMittal, Luxembourg (LU)

(72) Inventors: Pavan C. Venkatasurya, Highland, IN (US); Anirban Chakraborty, Chesterton, IN (US); Hassan Ghassemi-Armaki, Highland, IN (US)

(73) Assignee: ARCELORMITTAL, Luxembourg (LU)

( * ) Notice: Subject to any disclaimer, the term of this patent is extended or adjusted under 35 U.S.C. 154(b) by 564 days.

(21) Appl. No.: 16/609,408

(22) PCT Filed: May 7, 2018

(86) PCT No.: PCT/EP2018/061722
§ 371 (c)(1),
(2) Date: Oct. 29, 2019

(87) PCT Pub. No.: WO2018/202916
PCT Pub. Date: Nov. 8, 2018

(65) Prior Publication Data
US 2020/0181750 A1  Jun. 11, 2020

(30) Foreign Application Priority Data

May 5, 2017  (WO) .................. PCT/IB2017/052631

(51) Int. Cl.
| | | |
|---|---|---|
| C23C 2/06 | (2006.01) |
| C23C 2/40 | (2006.01) |
| C21D 8/02 | (2006.01) |
| C21D 9/46 | (2006.01) |
| B23K 11/11 | (2006.01) |
| B23K 11/16 | (2006.01) |
| C22C 38/02 | (2006.01) |
| C22C 38/04 | (2006.01) |
| C22C 38/06 | (2006.01) |
| C22C 38/12 | (2006.01) |

(52) U.S. Cl.
CPC .............. *C23C 2/06* (2013.01); *B23K 11/11* (2013.01); *B23K 11/166* (2013.01); *C21D 8/0205* (2013.01); *C21D 8/0226* (2013.01); *C21D 8/0236* (2013.01); *C21D 8/0273* (2013.01); *C21D 9/46* (2013.01); *C22C 38/02* (2013.01); *C22C 38/04* (2013.01); *C22C 38/06* (2013.01); *C22C 38/12* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2012/0132327 A1 | 5/2012 | Mukai et al. | |
| 2014/0311631 A1 | 10/2014 | Hayashi et al. | |
| 2015/0001188 A1 | 1/2015 | Oikawa et al. | |
| 2015/0086808 A1* | 3/2015 | Kasuya ................... C22C 38/08 |
| | | | 148/333 |
| 2015/0361532 A1 | 12/2015 | Nam et al. | |
| 2016/0208359 A1 | 7/2016 | Kasuya et al. | |
| 2017/0130290 A1 | 5/2017 | Fan et al. | |
| 2017/0191150 A1 | 7/2017 | Hanlon et al. | |
| 2018/0230581 A1 | 8/2018 | Okamoto et al. | |
| 2021/0095357 A1 | 4/2021 | Fan et al. | |

FOREIGN PATENT DOCUMENTS

| | | |
|---|---|---|
| CN | 103361547 A | 10/2013 |
| CN | 104838030 A | 8/2015 |
| CN | 105579606 A | 5/2016 |
| EP | 2436794 A1 | 4/2012 |

(Continued)

OTHER PUBLICATIONS

The International Search Report issued in connection with International application No. PCT/EP2018/061722 dated Apr. 20, 2018.

(Continued)

*Primary Examiner* — Anthony M Liang

(57) ABSTRACT

A method for producing a high-strength steel sheet having high ductility, formability and weldability includes providing a cold-rolled sheet, with a composition containing: 0.15% ≤C≤0.23%, 1.4% ≤Mn≤2.6%, 0.6% ≤Si≤1.3%, with C+Si/10≤0.30%, 0.4% ≤Al≤1.0%, with Al≥6(C+Mn/10)−2.5%, 0.010% ≤Nb≤0.035%, 0.1% ≤Mo≤0.5%, annealing the sheet at 860° C.-900° C. to obtain a structure consisting of at least 90% austenite and at least 2% intercritical ferrite, quenching to a temperature between Ms-10° C. and Ms-60° C. at a rate Vc higher than 30° C./s, heating to a temperature PT between 410° C. and 470° C. for 60 s to 130 s, hot-dip coating the sheet, and cooling to room temperature. The microstructure includes 45% to 68% of martensite, consisting of 85% to 95% partitioned martensite having a C content of at most 0.45%, and fresh martensite; 10% to 15% retained austenite; 2% to 10% intercritical ferrite; 20% to 30% lower bainite.

31 Claims, 1 Drawing Sheet

(56) References Cited

FOREIGN PATENT DOCUMENTS

| | | |
|---|---|---|
| JP | 2003193190 A | 7/2003 |
| JP | 2012229466 A | 11/2012 |
| JP | 2013237877 A | 11/2013 |
| JP | 2016160474 A | 9/2016 |
| JP | 2017524823 A | 8/2017 |
| KR | 20170026406 A | 3/2017 |
| KR | 20170027708 A | 3/2017 |
| RU | 2485202 C1 | 6/2013 |
| RU | 2531216 C2 | 10/2014 |
| WO | WO2011025015 A1 | 3/2011 |
| WO | WO2015015239 A1 | 2/2015 |
| WO | WO2016001710 A1 | 1/2016 |
| WO | WO2017037827 A1 | 3/2017 |

OTHER PUBLICATIONS

The International Preliminary Report on Patentability issued in connection with International application No. PCT/EP2018/061722 dated Apr. 23, 2019.

M. I Khan et al.: "Microstructure and Mechanical Properties of Resistance Spot Welded Advanced High Strength Steels", Materials Transactions, Jan. 1, 2008, pp. 1629-1637, URL:http://mme.uwaterloo.ca/camj/pdf/49_07_1629.pdf.

* cited by examiner

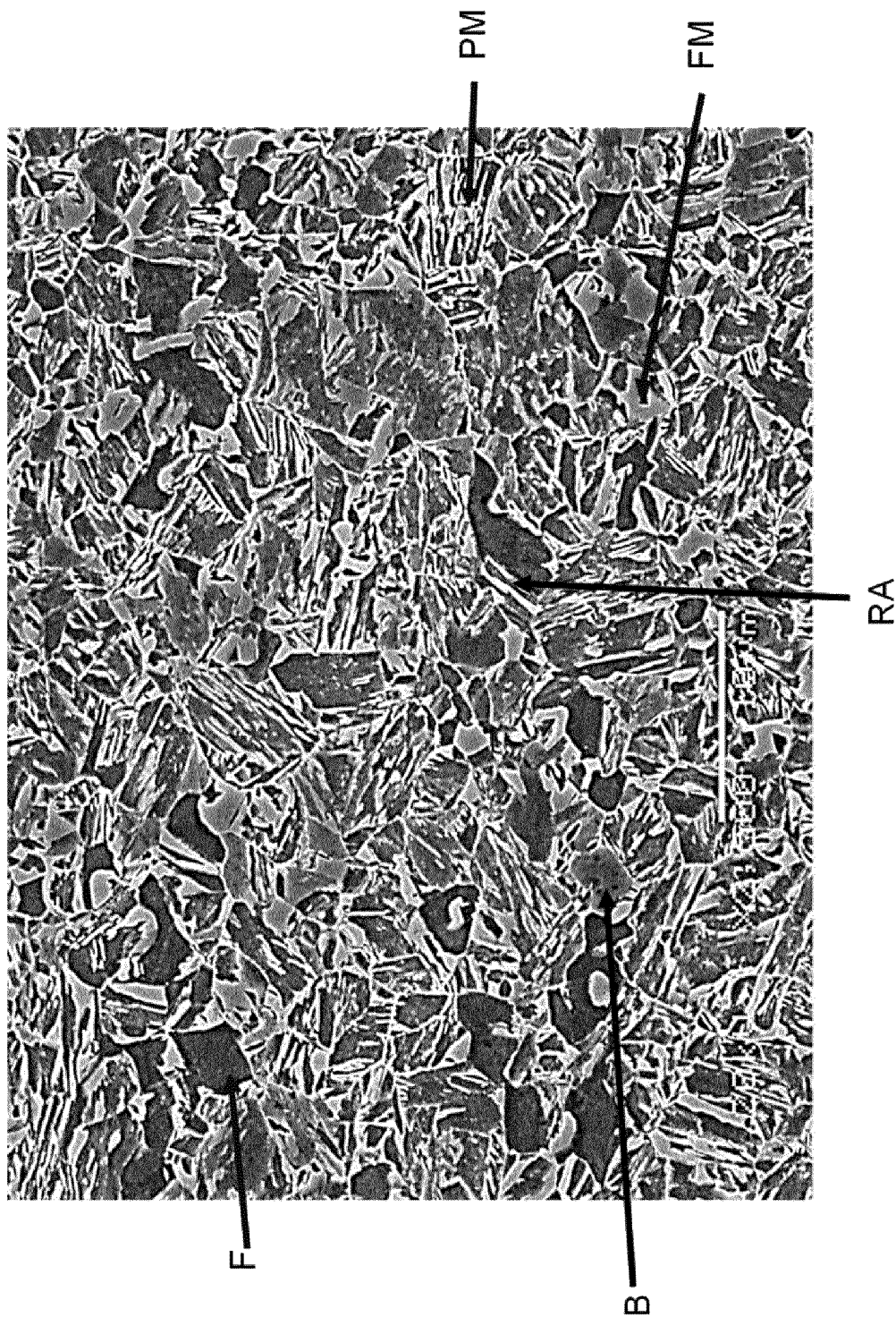

METHOD FOR PRODUCING A HIGH STRENGTH STEEL SHEET HAVING HIGH DUCTILITY, FORMABILITY AND WELDABILITY, AND OBTAINED STEEL SHEET

The present invention relates to a method for producing a high strength steel sheet having high ductility and formability together with a high weldability and to a sheet obtained with this method.

BACKGROUND

To manufacture various equipments such as parts of body structural members and body panels for automotive vehicles, it is known to use sheets made of DP (Dual Phase) steels or TRIP (Transformation Induced Plasticity) steels.

It is also known to use steels having a bainitic structure, free from carbides precipitates, with retained austenite, containing about 0.2% of C, about 2% of Mn, about 1.7% of Si, with a yield strength of about 750 MPa, a tensile strength of about 980 MPa, a total elongation of about 8%. These sheets are produced on continuous annealing lines by cooling from an annealing temperature higher than the Ac3 transformation point, down to a holding temperature above the Ms transformation point and maintaining the sheet at the temperature for a given time.

SUMMARY

To reduce the weight of the automotive in order to improve their fuel efficiency in view of the global environmental conservation, it is desirable to have sheets having high yield and tensile strengths, together with a good ductility and a good formability and more specifically a good stretch flangeability.

In this respect, it is desirable to have coated sheets having a yield strength of at least 800 MPa, a tensile strength TS of at least 1180 MPa, a total elongation TE of at least 13%, and a hole expansion ratio HER of at least 30%.

The tensile strength TS and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are very different, and are in particular lower, than the values of the total elongation measured according to the JIS Z 2201-05 standard.

The hole expansion ratio HER is measured according to ISO standard 16630:2009. Due to differences in the methods of measure, the values of the hole expansion ratio HER according to the ISO standard 16630:2009 are very different and not comparable to the values of the hole expansion ratio λ according to the JFS T 1001 (Japan Iron and Steel Federation standard).

However, in order to achieve such a combination of strength and ductility, it is generally require to add a high amount of C and Si. Such elements highly reduce the weldability of the steel, especially the spot weldability, by leading to the presence of cracks in the spot welds.

Therefore, a coated steel sheet is provided with the mechanical features and properties mentioned above, together with a high weldability, especially a high spot weldability, and a method to produce it.

For this purpose, a method is provided for producing a coated steel sheet having a yield strength of at least 800 MPa, a tensile strength of at least 1180 MPa, a total elongation according to ISO standard 6892-1 of at least 13% and a hole expansion ratio HER according to ISO standard 16630:2009 of at least 30%, wherein the method comprises the following successive steps:

providing a cold-rolled steel sheet, made of a steel having a chemical composition containing in weight %:

$0.15\% \leq C \leq 0.23\%$ $1.4\% \leq Mn \leq 2.6\%$, $0.6\% \leq Si \leq 1.3\%$ with $C+Si/10 \leq 0.30\%$, $0.4\% \leq Al \leq 1.0\%$, with $Al \geq 6(C+Mn/10) - 2.5\%$, $0.010\% \leq Nb \leq 0.035\%$, $0.1\% \leq Mo \leq 0.5\%$, the remainder being Fe and unavoidable impurities, annealing the cold-rolled steel sheet at an annealing temperature $T_A$ comprised between 860° C. and 900° C. so as to obtain an annealed steel sheet having a structure consisting of at least 90% of austenite and at least 2% of intercritical ferrite, quenching the annealed steel sheet from the annealing temperature $T_A$ down to a quenching temperature QT comprised between Ms-10° C. and Ms-60° C. at an average cooling rate Vc higher than 30° C./s, to obtain a quenched sheet, heating the quenched sheet from the quenching temperature QT to a partitioning temperature PT comprised between 410° C. and 470° C., and maintaining the sheet at the partitioning temperature PT for a partitioning time Pt comprised between 60 s and 130 s, hot-dip coating the steel sheet in a bath, cooling the steel sheet down to the room temperature, to obtain a coated steel sheet having a microstructure comprising, in area fraction:

between 45% and 68% of martensite, the martensite consisting of partitioned martensite and fresh martensite, between 85% and 95% of the martensite being partitioned martensite, said partitioned martensite having a C content of at most 0.45%, between 10% and 15% of retained austenite, between 2% and 10% of intercritical ferrite, between 20% and 30% of lower bainite.

In some preferred embodiments, the quenched sheet has, just before the heating to the partitioning temperature PT, a structure consisting of, in area fraction:

between 2% and 10% of intercritical ferrite, at least 10% of retained austenite, at least 38% of martensite, and at least 15% of lower bainite at most 5% of transformation ferrite.

According to an embodiment, the step of providing the cold-rolled steel sheet comprises the following successive steps:

hot rolling a semi-product made of said steel to obtain a hot rolled steel sheet, coiling said hot-rolled steel sheet at a temperature Tc comprises between 400° C. and 750° C., performing a batch annealing at a temperature $T_{HBA}$ comprised between 500° C. and 700° C. for a time comprised between 2 and 6 days, cold rolling said hot-rolled steel sheet to obtain said cold-rolled steel sheet.

In some preferred embodiments, the cold-rolled steel sheet is maintained at the annealing temperature $T_A$ for an annealing time $t_A$ comprised between 80 s and 180 s.

According to a preferred embodiment, the annealing temperature $T_A$ is of at most 880° C., so as to obtain upon annealing an annealed steel sheet having a structure consisting of at least 90% of austenite and more than 5% of intercritical ferrite, the microstructure of the coated steel sheet comprising more than 5% of intercritical ferrite.

In some preferred embodiments, the coated steel sheet has a structure consisting of, in area fraction:
between 45% and 68% of martensite, the martensite consisting of partitioned martensite and fresh martensite, between 85% and 95% of the martensite being partitioned martensite, said partitioned martensite having a C content of at most 0.45%,
between 10% and 15% of retained austenite,
between 2% and 10% of intercritical ferrite,
between 20% and 30% of lower bainite
at most 5% of transformation ferrite.

In some preferred embodiments, the average cooling rate Vc between the annealing temperature $T_A$ and the quenching temperature QT is of at least 50° C./s, the microstructure of the coated steel sheet consisting of, in area fraction:
between 45% and 68% of martensite, the martensite consisting of partitioned martensite and fresh martensite, between 85% and 95% of the martensite being partitioned martensite, said partitioned martensite having a C content of at most 0.45%,
between 10% and 15% of retained austenite,
between 2% and 10% of intercritical ferrite,
between 20% and 30% of lower bainite,
the coated steel sheet having a total elongation of at least 14%.

In some preferred embodiments, the average cooling rate Vc between the annealing temperature $T_A$ and the quenching temperature QT is of at least 60° C./s, the total elongation being of at least 14% and the tensile strength being of at least 1250 MPa.

In an embodiment, the Si and Al contents in the steel composition are such that 0.6% ≤Si <1.0% and 0.7%≤ Al≤1.0%.

In some preferred embodiments, the C content in the steel composition is such that 0.17% ≤C≤0.21%.

In some preferred embodiments, the C content in the steel composition is such that 1.9% ≤Mn≤2.3%.

In an embodiment, the steel sheet is coated with Zn or a Zn alloy.

A process for producing a resistance spot weld of at least two steel sheets is also provided, said process comprising:
producing a first coated steel sheet by a method according to the the above method,
providing a second steel sheet having a composition such that C+Si/10≤0.30% and Al≥6(C+Mn/10)−2.5%,
resistance spot welding said first coated steel sheet to said second steel sheet.

For example, the second steel sheet is produced by the above method.

A coated steel sheet is also provided made of a steel having a chemical composition containing in weight %:

0.15% ≤C≤0.23%

1.4% ≤Mn≤2.6%, 0.6% ≤Si≤1.3% with C+Si/10≤0.30%

0.4% ≤Al≤1.0%, with Al≥6(C+Mn/10)−2.5%, 0.010% ≤Nb≤0.035%, 0.1% ≤Mo≤0.5%, the remainder being Fe and unavoidable impurities, said coated steel sheet having a microstructure comprising, in area fraction:
between 45% and 68% of martensite, the martensite consisting of partitioned martensite and fresh martensite, between 85% and 95% of the martensite being partitioned martensite, said partitioned martensite having a C content of at most 0.45%,
between 10% and 15% of retained austenite,
between 2% and 10% of intercritical ferrite,
between 20% and 30% of lower bainite.

In some preferred embodiments, the retained austenite has an average C content comprised between 1.0% and 1.3%.

In a preferred embodiment, the microstructure of the coated steel sheet comprises more than 5% of intercritical ferrite.

In an embodiment, the Si and Al contents in the steel composition are such that 0.6% ≤Si <1.0% and 0.7%≤ Al≤1.0%.

In an embodiment, the C content in the steel composition is such that 0.17% ≤C≤0.21%.

In an embodiment, the Mn content in the steel composition is such that 1.9% ≤Mn≤2.3%.

Generally, the coated steel sheet has a yield strength of at least 800 MPa, a tensile strength of at least 1180 MPa, a total elongation according to ISO 6892-1 of at least 13% and a hole expansion ratio according to ISO 16630:2009 HER of at least 30%.

In an embodiment, the coated steel sheet is coated with Zn or a Zn alloy, the coating resulting from a coating at a temperature less than 480° C.

In some preferred embodiments, the coated steel sheet has a structure consisting of, in area fraction:
between 45% and 68% of martensite, the martensite consisting of partitioned martensite and fresh martensite, between 85% and 95% of the martensite being partitioned martensite, said partitioned martensite having a C content of at most 0.45%,
between 10% and 15% of retained austenite,
between 2% and 10% of intercritical ferrite,
between 20% and 30% of lower bainite
at most 5% of transformation ferrite.

In some preferred embodiments, the microstructure consists of, in area fraction:
between 45% and 68% of martensite, the martensite consisting of partitioned martensite and fresh martensite, between 85% and 95% of the martensite being partitioned martensite, said partitioned martensite having a C content of at most 0.45%,
between 10% and 15% of retained austenite,
between 2% and 10% of intercritical ferrite,
between 20% and 30% of lower bainite.

In this embodiment, the total elongation is generally of at least 14%.

According to an embodiment, the tensile strength is of at least 1250 MPa and the total elongation is of at least 14%.

A welded structure comprising at least ten resistance spot welds of at least a first steel sheet and a second steel sheet, wherein the first steel sheet is the above-mentioned coated steel sheet, and the second steel sheet has a composition such that C+Si/10≤0.30% and Al≥6(C+Mn/10)−2.5%, and wherein the mean number of cracks per resistance spot weld is less than 6.

In an embodiment, the second steel sheet is the above-mentioned coated steel sheet.

In some preferred embodiments, the welded structure is a welded structure of the first steel sheet and the second steel sheet (i.e. only two steel sheets), the average number of cracks having depth over 100 microns in the at least ten resistance spot welds is less than 0.1.

If the welded structure is a welded structure of the first steel sheet, the second steel sheet and a third steel sheet, the third steel sheet having a composition such that C+Si/10≤0.30% and Al≥6(C+Mn/10)−2.5%, the average number of cracks having depth over 100 microns in the at least ten resistance spot welds is generally less than 4.

A process for producing the above-mentioned welded structure is also provided, comprising:
providing the first steel sheet and the second steel sheet, superposing partly the first steel sheet and the second steel sheet,
applying an effort comprised between 3.5 and 5 kN by means of electrodes placed perpendicular to the superposed sheets,
resistance spot welding the first and second steel sheets to produce at least 10 resistance spot welds, with an intensity comprised between Imax and 1.1 *Imax, Imax being the intensity at which expulsion of liquid metal starts to be observed in resistance spot welding said first coated steel sheet to said second steel sheet.

A use of a coated steel sheet produced according to the above-mentioned method is also provided, or of the above-mentioned coated steel sheet, for the manufacture of structural parts in motor vehicles.

A use of a resistance spot weld manufactured according to the above method, or of the above welded structure, for the manufacture of structural parts in motor vehicles are also provided.

BRIEF SUMMARY OF THE DRAWING

The invention will now be described in details but without introducing limitations, with reference to the appended FIGURE, which shows a micrograph of a steel according to the invention.

DETAILED DESCRIPTION

The composition of the steel according to the present disclosure comprises, in weight percent:
0.15% to 0.23% of carbon for ensuring a satisfactory strength and improving the stability of the retained austenite which is necessary to obtain a sufficient elongation. Preferably, the carbon content is higher than or equal to 0.17%, and/or lower than or equal to 0.21%. If the carbon content is too high, the hot rolled sheet is too hard to cold roll and the weldability, especially the spot weldability, is insufficient. If the carbon content is below 0.15%, the tensile strength will not reach 1180 MPa.

1.4% to 2.6% of manganese. The minimum is defined to have a sufficient hardenability in order to obtain a microstructure containing at least 45% of martensite and at least 85% of partitioned martensite in martensite, and a tensile strength of at least 1180 MPa. The maximum is defined to avoid having segregation issues which are detrimental for the ductility. Preferably, the manganese content is higher than or equal to 1.9%, and/or lower than or equal to 2.3%.

0.6% to 1.3% of silicon and 0.4% to 1.0% of aluminum. In the steel of the present disclosure, Si and Al are both added as austenite stabilizers. Especially, Si and Al delay the formation of carbides when the steel sheet is cooled at a temperature so as to obtain a partial martensitic transformation, and immediately reheated and maintained at a temperature PT during which the carbon is partitioned from martensite to austenite. If Si and Al are added in sufficient amounts, the carbon partitioning occurs without significant carbides precipitation. Moreover, Si provides a solid solution strengthening and improves the hole expansion ratio.

Nevertheless, the Si content has to be limited to 1.3% to avoid the formation of silicon oxides at the surface of the sheet which would be detrimental to the coatability.

Most of all, the inventors have found that when Si/10>0.30% −C (Si and C being expressed in weight percentage), due to the LME (liquid metal embrittlement phenomenon), silicon is detrimental to the spot welding of galvanized sheets. LME occurrence causes cracks at grain boundaries in the heat affected zones and in the weld metal of welded joints. Therefore (C +Si/10) has to be maintained less than or equal to 0.30%. Preferably, the Si content is of at most 1.0%

Besides, Al must be added in a content of at least 0.4% so as to achieve sufficient austenite stabilization. However, the Al content is limited to 1.0% in order to prevent the increase of the Ac3 transformation temperature, which would imply higher cost when heating at high temperature for obtaining austenitization of the steel sheet in the annealing step.

In addition, Al has a favorable effect by reducing the LME sensitivity when C and/or Mn contents are high. Thus, the Al content is such that Al≥6(C+Mn/10)−2.5%. Preferably, the Al content is of at least 0.7%.

between 0.010% and 0.035% of niobium, in order to refine the austenite grains during hot-rolling and to provide precipitation strengthening during the final heat-treatment. A Nb content of 0.010% to 0.035% makes it possible to obtain satisfactory yield strength and elongation levels, in particular a yield strength of at least 800 MPa.

0.1% to 0.5% of molybdenum, to increase the hardenability and to stabilize the retained austenite in order to strongly reduce austenite decomposition during partitioning. Preferably, the Mo content is of at least 0.20%.

The balance is iron and residual elements resulting from the steelmaking. In this respect, Ni, Cr, Cu, Ti, V, B, S, P and N at least are considered as residual elements which are unavoidable impurities. Therefore, their contents by weight percent are less than 0.05% for Ni, 0.01% for Cr, 0.03% for Cu, 0.007% for V, 2 ppm for B, 0.005% for S, 0.02% for P and 0.010% for N. The Ti content is limited to 0.05% because above such values, large-sized carbonitrides would precipitate mainly in the liquid stage, and the formability of the steel sheet would decrease, making the 13% target for the total elongation more difficult to reach.

With the coated steel sheets of the present disclosure, especially coated with Zn or Zn alloys, the spot weldability can be affected by the LME phenomenon (Liquid Metal Embrittlement).

The sensitivity of a particular steel to this phenomenon can be evaluated by tensile test performed at high temperature. In particular, this hot tensile test can be performed using a Gleeble RPI thermal simulator, such device being known per se in the art.

This test which is named "Gleeble LME test" is described as follows:

- samples of coated sheets having a thickness from 0.7 mm to 3 mm are submitted to high temperature tensile tests in order to determine which is the minimal critical displacement for which cracking around the welded zone occur. The samples which are cut in the sheet have a calibrated zone which is 10 mm long and 10 mm wide, and heads which are 40 mm long and 30 mm wide, the radius of curvature between the heads and the calibrated part being 5 mm.
- the high temperature tensile tests are performed by heating rapidly (1000° C./s) each sample, maintaining the sample at a predetermined temperature and submitting the heated sample to a predetermined elongation or displacement, then cooling down the sample in air, the elongation or displacement being maintained. After cooling, the samples are observed in order to determine if there is LME cracking or not. It is determined that the sample has a crack if at least one crack of at least 2 mm is formed on the sample.
- the tests are made at a plurality of predetermined temperatures, such as 700° C., 750° C., 800° C., 850° C., 900° C. and 950° C., and with elongations or displacements of 0.5 mm, 0.75 mm, 1 mm, 1.25 mm, 1.5 mm, 1.75 mm, 2 mm, and so on; the elongations or displacements are the elongations or displacements of the jaws maintaining the samples on the Gleeble simulator,
- the critical displacement for cracking onset is reported and the minimum critical displacement, i.e. the minimum displacement for which cracking occurs, is determined for the considered temperature range.

Usually, it is considered that when the minimum critical displacement is less than 1.5 mm at a temperature between 700° C. and 800° C., the probability of occurrence of LME in resistance spot welding is high, and when the minimum critical displacement is at least 1.5 mm, the probability to observe many LME cracks in resistance spot welding is low.

In this respect, the inventors have discovered that for the steels of the present disclosure, such that (C+Si/10) is less than or equal to 0.30%, and Al is higher than or equal to 6(C+Mn/10) −2.5%, the minimum critical displacement is at least 1.5 mm, and when (C+Si/10) is more than 0.30% and/or Al is lower than 6(C+Mn/10)−2.5%, the minimum critical displacement is less than 1.5 mm, and even less than 1 mm.

As examples, Gleeble LME tests have been made with steels having the following compositions:
S1: C=0.226%, Mn=2.01%, Si=0.716, Al=0.802%,
S2: C=0.204%, Mn=2.07%, Si=1.44%, Al=0.033%,
For S1, C+Si/10=0.2976% and the minimum critical displacement is 2.25 mm.
For S2, C+Si/10=0.4412% and the minimum critical displacement is 0.9 mm.

Another method for evaluating the spot weldability of the coated sheets is a "LME spot welding test" which allows determining the probability to have cracked welds among an important number of resistance spot welds, for example in an industrial production of products comprising parts which are assembled by resistance spot welding such as, for example, car bodies.

This "LME spot welding test" is derived from the electrode life test for resistance spot welding in which a plurality of resistance spot welds, for example 30, are performed on three sheets superposed together: the sheet to be tested and two support sheets made of galvanized low carbon sheets, for example DX54D+Z according to EN 10346. The thicknesses of the sheets are 1.6 mm and the resistance spot welds are made according to the ISO Standard 18278-2 for heterogeneous assemblies. The parameters are:

electrode tip diameter: 8 mm,
welding force: 4.5 kN,
welding time: 3 pulses of 180 ms separated by 40 ms periods (cool times),
holding time: 400 ms.

For this test, in order to determine the eventual occurrence of cracks in the resistance spot welds, the samples are cut and polished. The resistance spot welds are then etched with picric acid, and observed by microscope, for example with a 200× magnification, in order to determine the number of cracks in each observed resistance spot weld and the sum of the length of the cracks in each resistance spot weld.

For the examples S1 and S2, the proportions of the numbers of cracks for each resistance spot weld are as follows:

S1: Gleeble LME test≥1.5 mm, 80% of the resistance spot welds have less than 10 cracks, 0% have 20 or more cracks,
S2: Gleeble LME test<1.5 mm, only 40% of the resistance spot welds have less than 10 cracks, and 30% have 20 or more cracks.

If the mean number of cracks in each resistance spot weld is considered, the results are as follows:

S1: the mean number of cracks in each resistance spot weld is 5,
S2: the mean number of cracks in each resistance spot weld is 10.

Hot rolled sheet having a thickness between 2 and 5 mm can be produced in a known manner from the steel composition of the present disclosure mentioned above.

As an example, the reheating temperature before rolling can be comprised between 1200° C. and 1280° C., preferably about 1250° C., the finish rolling temperature is preferably comprised between Ar3 and 950° C., and preferably higher than 850° C., and the coiling is performed at a temperature preferably comprised between 400° C. and 750° C. Preferably, if Si>1.0%, the coiling temperature is lower than or equal to 550° C.

After the coiling, the sheet has a ferrito-bainitic-martensitic or ferrito-pearlito-bainitic structure.

After the coiling, the sheet is preferably batch annealed in order to reduce the hardness of the hot-rolled steel sheet and therefore improve the cold-rollability of the hot-rolled steel sheet.

For example, the hot-rolled steel sheet is batch annealed at a temperature between 500° C. and 700° C., for example between 550° C. and 650° C., for a time between 2 and 6 days, preferably between 3 and 5 days. This time includes the heating to the batch annealing temperature and the cooling from the batch annealing temperature to ambient temperature.

After batch annealed, if performed, the cold-rolled steel sheet has a ferrite-bainito-tempered martensitic structure.

The hot-rolled and optionally batch annealed steel sheet is optionally pickled, then cold rolled to obtain a cold rolled steel sheet having a thickness between 0.7 mm and 3 mm, for example in the range of 0.8 to 2 mm.

Then, the cold-rolled steel sheet is heat treated, preferably on a combined continuous annealing and hot-dip coating line.

The heat treatment and coating comprise the steps of:
annealing the cold-rolled steel sheet at an annealing temperature $T_A$ comprised between 860° C. and 900° C., the annealing temperature $T_A$ being such that, at the end of the annealing step, the steel has a structure consisting of austenite and intercritical ferrite, the fraction of austenite being at least 90% and the fraction of intercritical ferrite being at least 2%. Thus, the annealing is performed at a temperature lower than Ac3, Ac3 being the temperature of the end of the transformation into austenite during the heating step. If the annealing temperature $T_A$ is lower than 860° C., insufficient fractions of martensite and retained austenite are achieved in the final structure (i.e. after heat treatment and coating), so that the targeted tensile strength and total elongation are not achieved. If the annealing temperature $T_A$ is higher than 900° C., the final structure comprises an insufficient fraction of intercritical ferrite, so that a total elongation of at least 13% is not achieved. Preferably, the annealing temperature is of at most 880° C., so as to achieve at the end of the annealing step a structure consisting of at least 90% of austenite and more than 5% of intercritical ferrite.

The sheet is maintained at the annealing temperature i.e. maintained between $T_A$–5° C. and $T_A$ +5° C., for an annealing time $t_A$ preferably comprised between 80 s and 180 s. Preferably, the annealing time $t_A$ is comprised between 85 s and 136 s.

just after the annealing step, quenching the annealed steel sheet by cooling it down from the annealing temperature $T_A$ to a quenching temperature QT lower than the Ms transformation point of the austenite obtained after annealing, at a cooling rate fast enough to avoid the formation of upper and granular bainite, and avoid or limit the formation of ferrite.

The average cooling rate from the annealing temperature $T_A$ to the quenching temperature QT is strictly higher than 30° C./s, preferably higher than 50° C./s, still preferably higher than 60° C./s.

Indeed, with a cooling rate of 30° C./s or lower, the targeted yield and tensile strengths are not achieved. A cooling rate of more than 30° C./s allows limiting the formation of ferrite upon cooling, to a fraction of less than 5%.

A cooling rate of at least 50° C./s allows suppressing the formation of ferrite upon cooling. Thus, a cooling rate of at least 50° C./s ensures that the structure of the sheet upon quenching, and therefore the final structure of the coated steel sheet, does not comprise any ferrite resulting from the transformation of austenite to ferrite. A cooling rate of at least 50° C./s allows achieving a total elongation of at least 14%, in combination with the targeted yield strength, tensile strength and hole expansion ratio.

A cooling rate of at least 60° C./s allows achieving a total elongation of at least 14% and a tensile strength of at least 1250 MPa.

The quenching temperature is comprised between Ms-60° C. and Ms-10° C. For each particular composition of the steel and each structure, one skilled in the art knows how to determine the Ms transformation point of the austenite remaining after annealing. If the quenching temperature QT is lower than Ms-60° C., the fraction of martensite create upon quenching is too high to stabilize a sufficient amount of retained austenite above 10% in the final structure, so that the total elongation does not reach 13%. Moreover, if the quenching temperature QT is higher than Ms-10° C., the fraction of partitioned martensite in the final structure is too low to obtain the desired tensile strength.

The structure of the steel at the quenching temperature QT preferably comprises:
between 2% and 10%, and preferably more than 5% of intercritical ferrite,
at least 10% of retained austenite,
at least 38% of martensite, and
at least 15% of lower bainite.

The intercritical ferrite results from the annealing at a temperature below Ac3. The intercritical ferrite is different from the ferrite that could be created after the annealing, named hereinafter "transformation ferrite", resulting from the transformation of austenite to ferrite. Such transformation ferrite could for example occur during the cooling from the annealing temperature $T_A$ to the quenching temperature QT if the cooling rate is insufficient to prevent such formation (i.e. 30° C./s or lower). In particular, contrarily to the transformation ferrite, the intercritical ferrite is polygonal. Besides, the transformation ferrite is enriched in carbon and manganese, i.e. has carbon and manganese contents which are higher than the carbon and manganese contents of the intercritical ferrite. The intercritical ferrite and the transformation ferrite can therefore be differentiated by observing a micrograph with a FEG-TEM microscope using secondary electrons, after etching with metabisulfite. On such micrograph, the intercritical ferrite appears in medium grey, whereas the transformation ferrite appears in dark grey, owing to its higher carbon and manganese contents.

The structure at the quenching temperature QT may comprise transformation ferrite, with however a fraction of at most 5%, and generally of at most 2%.

Thus, the structure of the steel at the quenching temperature generally consists of:
between 2% and 10%, and preferably more than 5% of intercritical ferrite,
at least 10% of retained austenite,
at least 38% of martensite,
at least 15% of lower bainite, and
at most 5% of transformation ferrite.

Moreover, when the cooling rate to the quenching temperature QT is of at least 50° C./s, the structure at the quenching temperature QT does not comprise any transformation ferrite. Thus, the structure at the quenching temperature QT consists of, in area fraction:
between 2% and 10%, and preferably more than 5% of intercritical ferrite,
at least 10% of retained austenite,
at least 38% of martensite, and
at least 15% of lower bainite.

the quenched sheet is optionally held at the quenching temperature QT for a holding time comprised between 2 s and 8 s, preferably between 3 s and 7 s.

the sheet is then reheated from the quenching temperature up to a partitioning temperature PT comprised between 410° C. and 470° C., and maintained at the partitioning temperature PT for a partitioning time Pt comprised between 60 s and 130 s. During this partitioning step, the carbon is partitioned, i.e. diffuses from the martensite into the austenite, which is thus enriched in carbon.

If the partitioning temperature PT is higher than 470° C. or lower than 410° C., the elongation of the final product is not satisfactory.

If the partitioning time is lower than 60 s, an insufficient partitioning of carbon from the martensite to the austenite occurs, so that the carbon content in the martensite will be too high and the carbon content in the retained austenite too low. As a result, the elongation of the final product is not satisfactory.

the sheet is hot-dip coated just after the step of maintaining the sheet at the partitioning temperature PT. The hot dip coating can be, for example, galvanizing but all metallic hot dip coating is possible provided that the temperatures at which the sheet is brought to during coating remain less than 480° C. When the sheet is galvanized, it is performed with the usual conditions, for example through a Zn-bath with temperature ranging from 430 to 480° C. The steel according to the present disclosure can be galvanized with Zn or with a Zn alloy, as for example zinc-magnesium or zinc-magnesium-aluminum.

immediately after the hot-dip coating step, the coated steel sheet is cooled to the room temperature, at a cooling speed preferably higher than 1° C./s, for example between 2° C./s and 20° C./s.

This heat treatment and coating make it possible to achieve a final structure (i.e. after partitioning, hot-dip coating and cooling to the room temperature) comprising, in area fraction:

between 45% and 68% of martensite,
between 10% and 15% of retained austenite,
between 2% and 10% of intercritical ferrite,
between 20% and 30% of lower bainite.

The martensite consists of partitioned martensite and fresh martensite. Between 85% and 95% of the martensite is partitioned martensite, the rest, i.e. between 5% and 15%, being fresh martensite.

Unlike a tempered martensite that would be achieved through a heat-treatment involving annealing, quenching and tempering, the partitioned martensite of the steel of the present disclosure has a C content of at most 0.45%. This content results from the partitioning of carbon from martensite towards austenite during the partitioning step.

By contrast, the fresh martensite, which results from the transformation of carbon enriched austenite into martensite after the partitioning step, has a C content which is of at least 0.9% and generally less than 1.2%.

The fraction of fresh martensite with respect to the martensite is comprised between 5% and 15%, so that the fresh martensite fraction with respect to the whole structure is of at most 10%. Indeed, a fraction of fresh martensite higher than 10% would lead to a hole expansion ratio HER, according to Standard ISO 16630:2009, lower than 30%.

A fraction of retained austenite of at least 10%, together with a fraction of intercritical ferrite of at least 2%, allows obtaining a total elongation of at least 13%, the total elongation being measured according to ISO Standard ISO 6892-1.

Furthermore, this treatment allows obtaining an increased C content in the retained austenite, which is of at least 1.0%, and up to 1.3%. This increased C content stabilizes the retained austenite, and contributes to achieving a total elongation of at least 13%.

The ferrite in the structure is intercritical ferrite, i.e. ferrite resulting from the annealing at a temperature below Ac3.

The fraction of intercritical ferrite is preferably comprised between 5% (excluding 5%) and 10%.

The coated steel sheet according to the present disclosure may comprise transformation ferrite, with a fraction however of at most 5%, generally of at most 2%. Thus, the structure of the coated steel sheet according to the present disclosure consists of:

between 45% and 68% of martensite,
between 10% and 15% of retained austenite,
between 2% and 10% of intercritical ferrite,
between 20% and 30% of lower bainite,
at most 5%, and preferably at most 2% of transformation ferrite.

Preferably, the structure does not comprise any transformation ferrite.

Thus, the structure of the coated steel sheet preferably consists of, in area fraction:

between 45% and 68% of martensite,
between 10% and 15% of retained austenite,
between 2% and 10% of intercritical ferrite,
between 20% and 30% of lower bainite.

The microstructural features are for example determined by observing the microstructure with a Scanning Electron Microscope with a Field Emission Gun ("FEG-SEM") at a magnification greater than 5000×, coupled to an Electron Backscatter Diffraction ("EBSD") device and to a Transmission Electron Microscopy (TEM).

With this heat-treatment, steel sheets having a yield strength YS of at least 800 MPa, a tensile strength TS of at least 1180 MPa, and even of at least 1250 MPa, a total elongation TE according to the ISO standard 6892-1 of at least 13%, and even higher than 14%, and a hole expansion ratio HER according to the ISO standard 16630:2009 of at least 30%, and even of at least 35%, can be obtained.

The yield strength YS may be higher than 1000 MPa, especially if the partitioning time Pt is of at least 110 s.

Example 1

As examples and comparison, sheets made of steel compositions according to table I, have been manufactured, the elements being expressed in weight. The transformation temperatures such as Ac1 and Ac3 are reported in table I. Ac1 and Ac3 were measured by dilatometry.

TABLE I

| Steel | C (%) | Mn (%) | Si (%) | Al (%) | Nb (%) | Mo (%) | B (ppm) | Ti (%) | ( C +Si/10) (%) | Ac1 (° C.) | Ac3 (° C.) |
|---|---|---|---|---|---|---|---|---|---|---|---|
| I1 | 0.2 | 2.1 | 1.0 | 0.6 | 0.02 | 0.3 | — | res. | 0.30 | 750 | 915 |
| R1 | 0.18 | 2.0 | 1.0 | res. | 0.02 | 0.3 | 10 | 0.02 | 0.28 | 731 | 923 |

In this Table, "res." means that the element is only present as a residual, and that no voluntary addition of this element was made.

The sheets were hot-rolled, then coiled at 550° C.

The inventors first assessed the effect of batch annealing on the properties of the hot-rolled steel sheets.

To that end, the inventors subjected a hot-rolled steel sheet made of steel I1 to a batch annealing at a temperature of 550° C. for 2 days, and compared the mechanical properties of the batch annealed steel sheet to those of the same hot-rolled steel sheet not subjected to batch annealing.

The mechanical properties, namely the yield strength YS, the tensile strength TS, the uniform elongation UE and the total elongation TE are reported in Table II below.

TABLE II

| Example | Batch annealing? | YS (MPa) | TS (MPa) | UE (%) | TE (%) |
|---|---|---|---|---|---|
| 1 | No | 798 | 1145 | 7.4 | 10 |
| 2 | Yes | 597 | 995 | 9.4 | 13.8 |

These results show that the batch annealing results in a softening of the hot-rolled steel sheet, thereby improving its cold-rollability.

Besides, hot-rolled steel sheets made of steels I1 and R1 were batch annealed for 2 days at 550° C., pickled and cold-rolled. The cold-rolled sheets were annealed, quenched and partitioned. After partitioning, the sheets were hot-dip coated by galvanizing at 460° C. then cooled to the room temperature.

The conditions of treatment are reported in Table III.

TABLE III

| Example | Steel | Ms (° C.) | $T_A$ (° C.) | $t_A$ (s) | Vc (° C./s) | QT (° C.) | PT (° C.) | Pt (s) |
|---|---|---|---|---|---|---|---|---|
| 3 | I1 | 355 | 900 | 136 | >30 | 275 | 450 | 100 |
| 4 | I1 | 355 | 900 | 136 | >30 | 325 | 450 | 100 |
| 5 | I1 | 355 | 900 | 136 | >30 | 325 | 400 | 100 |
| 6 | I1 | 355 | 880 | 136 | >30 | 325 | 450 | 100 |
| 7 | I1 | 355 | 900 | 100 | >30 | 325 | 450 | 100 |
| 8 | I1 | 355 | 880 | 85 | >30 | 325 | 450 | 62 |
| 9 | I1 | 355 | 880 | 172 | >30 | 325 | 450 | 124 |
| 10 | I1 | 355 | 880 | 136 | 75 | 325 | 450 | 100 |
| 11 | I1 | 355 | 880 | 136 | 55 | 325 | 450 | 100 |
| 12 | I1 | 355 | 880 | 136 | 30 | 325 | 450 | 100 |
| 13 | I1 | 355 | 820 | 136 | >30 | 200 | 400 | 100 |
| 14 | R1 | 290 | 800 | 136 | >30 | 200 | 460 | 100 |
| 15 | R1 | 290 | 800 | 136 | >30 | 200 | 400 | 100 |

In this table, Ms designates the martensite start temperature of the austenite resulting from the annealing, $T_A$ is the annealing temperature, $t_A$ is the annealing time, Vc is the average cooling rate between the annealing temperature $T_A$ and the quenching temperature, QT the quenching temperature, PT the partitioning temperature and Pt the partitioning time.

The microstructures obtained for the sheets are reported in Table IV. F designates the area fraction of intercritical ferrite, M designates the area fraction of martensite, PM designates the percentage of partitioned martensite in the martensite, RA designates the area fraction of retained austenite and B designates the area fraction of lower bainite. For each steel sheet, Table IV reports whether the fraction or percentage of each microstructural component is comprised within the targeted range.

TABLE IV

| Example | Steel | F: 2-10%? | M: 45-68%? | PM: 85-95%? | C content in PM: <0.4? | B: 20-30%? | RA: 10-15%? | C content in RA: 1.0-1.3%? |
|---|---|---|---|---|---|---|---|---|
| 3 | I1 | Yes | No (>68%) | Yes | No | No | No (<10%) | Yes |
| 4 | I1 | Yes | Yes | Yes | Yes | Yes | 14.6 | Yes |
| 5 | I1 | Yes | Yes | Yes | No | Yes | No | No |
| 6 | I1 | Yes | Yes | Yes | Yes | Yes | Yes | Yes |
| 7 | I1 | Yes | Yes | Yes | Yes | Yes | Yes | Yes |
| 8 | I1 | Yes | Yes | Yes | Yes | Yes | Yes | Yes |
| 9 | I1 | Yes | Yes | Yes | Yes | Yes | Yes | Yes |
| 10 | I1 | Yes | Yes | Yes | Yes | Yes | Yes | Yes |
| 11 | I1 | Yes | Yes | Yes | Yes | Yes | Yes | Yes |
| 12 | I1 | Yes * | Yes | No (<85%) | No | Yes | No | No |
| 13 | I1 | No (<10%) | Yes | No (<85%) | No | No | No | No |
| 14 | R1 | No (<10%) | Yes | Yes | Yes | No | No | No |
| 15 | R1 | No (<10%) | Yes | Yes | Yes | No | No | No |

* further contains more than 5% of transformation ferrite

Besides, the hole expansion ratio HER measured according to the standard ISO 16630:2009, the yield strength YS, the tensile strength TS, the uniform elongation UE and the total elongation TE of each steel sheet were determined. The yield strength YS, the tensile strength TS, the uniform elongation UE and the total elongation TE were measured according to the ISO standard ISO 6892-1, published in October 2009. The properties are reported in Table V.

In this table n.d. means that the property was not determined.

These examples show that with a method according to the present disclosure, coated steel sheets having a tensile strength of at least 1180 MPa and a total elongation according to ISO 6892-1 of at least 13% can be obtained. These steel sheets have also a yield strength of at least 800 MPa, and a hole expansion ratio HER according to ISO 16630:2009 of at least 30%. These steel sheets also have a uniform elongation of at least 9%, and generally of more than 10%.

TABLE V

| Example | Steel | YS (MPa) | TS (MPa) | UE (%) | TE (%) | HER (%) |
|---|---|---|---|---|---|---|
| 3 | I1 | 1171 | 1263 | 7.6 | 11.3 | n.d. |
| 4 | I1 | 1073 | 1220 | 10 | 13.9 | n.d. |
| 5 | I1 | 1112 | 1207 | 5.4 | 8.9 | n.d. |
| 6 | I1 | 970 | 1196 | 11.1 | 15.2 | 32 |
| 7 | I1 | 1073 | 1220 | 10 | 13.9 | 37 |
| 8 | I1 | 939 | 1217 | 10.7 | 14.5 | n.d. |
| 9 | I1 | 1030 | 1207 | 9.5 | 13.3 | n.d. |
| 10 | I1 | 1080 | 1258 | 11 | 14.9 | n.d. |
| 11 | I1 | 996 | 1189 | 10.2 | 14.7 | n.d. |
| 12 | I1 | 697 | 1150 | 9 | 13.4 | n.d. |
| 13 | I1 | 974 | 1151 | 8.5 | 11.3 | n.d. |
| 14 | R1 | 1081 | 1236 | 7.5 | 11.8 | <30% |
| 15 | R1 | 1018 | 1196 | 6.7 | 10.5 | <30% |

The comparison of examples 3 and 4 shows that only when the quenching temperature is comprised between Ms-60° C. and Ms-10° C. are the targeted properties achieved. By contrast, if the quenching temperature QT is lower than Ms-60° C. (example 3), the fraction of martensite created upon quenching is too high, so that a sufficient austenite fraction could not be achieved. As a result, a total elongation of at least 13% is not achieved.

The comparison of examples 4 and 5 shows that only when the partitioning temperature PT is comprised between 410° C. and 470° C. are the targeted properties achieved. By contrast, if the partitioning temperature PT is lower than 410° C. (example 5), an insufficient partitioning of carbon from the martensite to the austenite occurs, so that the austenite is not sufficiently stabilized to secure a total elongation of at least 13%.

The comparison of examples 6 and 7 shows that a decrease in the annealing temperature from 900° C. to 880° C. allows achieving an improved balance of tensile strength and total elongation.

Examples 6, 8 and 9 demonstrate that the method is very robust with variations of the annealing time $t_A$ and partitioning time Pt, which may be due for example to variations of the line speed. Therefore, the targeted mechanical properties are achieved with the method of the present disclosure irrespective of unwanted variations of the speed line. It should however be noted that longer partitioning times Pt lead to an increase in the yield strength YS (example 10), due to a reduction of the fresh martensite fraction.

With examples 10 to 12, the inventors investigated the influence of the cooling rate Vc during quenching on the mechanical properties.

These examples show that when the cooling rate is higher than 30° C./s, the targeted properties are achieved. By contrast, if the cooling rate is of 30° C./s or less (example 13), more than 5% of ferrite is created upon cooling, and an insufficient fraction of martensite is obtained at QT. As a consequence, the final structure comprises an insufficient partitioned martensite percentage, and comprises transformation ferrite. Therefore, a yield strength of at least 800 MPa and a tensile strength of at least 1180 MPa are not achieved.

Besides, examples 10 and 11 demonstrate that when the cooling rate is of at least 50° C./s, a total elongation higher than 14% is achieved, and when the cooling rate Vc is of at least 60° C./s, a tensile strength of at least 1250 MPa and a total elongation of at least 14% are achieved.

Example 13 shows that when the annealing, quenching and partitioning temperatures are too low, the targeted properties are not achieved. Especially, owing to the low annealing temperature, the intercritical ferrite fraction is higher than 10%. Besides, owing to the low quenching and partitioning temperatures, the fraction of martensite created upon quenching is too high, and insufficient partitioning of carbon from this martensite to the austenite occurred during partitioning. As a result, a tensile strength of at least 1180 MPa and a total elongation of at least 13% are not achieved.

Examples 14 and 15 are made of steel R1, having in particular an insufficient Al content.

Besides, examples 14 and 15 were produced with too low annealing and quenching temperatures.

Thus, examples 14 and 15 have a total elongation lower than 13% and a hole expansion ratio lower than 30%.

A micrograph showing the microstructure of example 11 is shown on the appended Figure. On this Figure, F designates the intercritical ferrite, B designates lower bainite, PM designates partitioned martensite, FM designates fresh martensite and RA designates retained austenite.

Example 2

Sheets made of steel compositions according to table VI have been manufactured, the elements being expressed in weight. The transformation temperatures such as Ac1 and Ac3 are reported in table I. Ac1 and Ac3 were measured by dilatometry. In Table VI, steel I1 is the same steel as in Table I.

TABLE VI

| Steel | C (%) | Mn (%) | Si (%) | Al (%) | Nb (%) | Mo (%) | B (ppm) | Ti (%) | (C + Si/10) (%) | Ac1 (° C.) | Ac3 (° C.) |
|---|---|---|---|---|---|---|---|---|---|---|---|
| I1 | 0.2 | 2.1 | 1.0 | 0.6 | 0.02 | 0.3 | — | res. | 0.30 | 750 | 915 |
| R2 | 0.18 | 2.70 | 2.1 | res. | res. | res. | — | res. | 0.39 | 770 | 860 |

In this Table, "res." means that the element is only present as a residual, and that no voluntary addition of this element was made.

The sheets were hot-rolled, then coiled at 550° C. Hot-rolled steel sheets made of steels I1 and R2 were batch annealed for 2 days at 550° C., pickled and cold-rolled to a thickness of 1.6 mm.

The cold-rolled sheets were annealed, quenched and partitioned. After partitioning, the sheets were hot-dip coated by galvanizing at 460° C. then cooled to the room temperature.

The conditions of treatment are reported in Table VII.

TABLE VII

| Example | Steel | Ms (° C.) | $T_A$ (° C.) | $t_A$ (s) | Vc (° C./s) | QT (° C.) | PT (° C.) | Pt (s) |
|---|---|---|---|---|---|---|---|---|
| 16 | I1 | 355 | 880 | 136 | >30 | 325 | 450 | 100 |
| 17 | R2 | 363 | 880 | 136 | >30 | 300 | 460 | 30 |

In this table, Ms designates the martensite start temperature of the austenite resulting from the annealing, $T_A$ is the annealing temperature, $t_A$ is the annealing time, Vc is the average cooling rate between the annealing temperature $T_A$ and the quenching temperature, QT the quenching temperature, PT the partitioning temperature and Pt the partitioning time. Example 16 corresponds to example 6 described above.

The microstructures obtained for the sheets are reported in Table VIII. F designates the area fraction of intercritical ferrite, M designates the area fraction of martensite, PM designates the percentage of partitioned martensite in the martensite, RA designates the area fraction of retained austenite and B designates the area fraction of lower bainite.

TABLE VIII

| Example | Steel | F: 2-10%? | M: 45-68%? | PM: 85-95%? | C content in PM: <0.45? | B: 20-30%? | RA: 10-15%? | C content in RA: 1.0-1.3%? |
|---|---|---|---|---|---|---|---|---|
| 16 | I1 | Yes | Yes | Yes | Yes | Yes | Yes | Yes |
| <u>17</u> | R2 | <u>No (0%)</u> | ** | ** | Yes | ** | Yes | n.d. |

** the sum of martensite and bainite for example 17 is between 85% and 90%.

Besides, the hole expansion ratio HER measured according to the standard ISO 16630:2009, the yield strength YS, the tensile strength TS, the uniform elongation UE and the total elongation TE of each steel sheet were determined. The yield strength YS, the tensile strength TS, the uniform elongation UE and the total elongation TE were measured according to the ISO standard ISO 6892-1, published in October 2009. The properties are reported in Table IX.

In this table n.d. means that the property was not determined.

TABLE IX

| Example | Steel | YS (MPa) | TS (MPa) | UE (%) | TE (%) | HER (%) |
|---|---|---|---|---|---|---|
| 16 | I1 | 970 | 1196 | 11.1 | 15.2 | 32 |
| 17 | R2 | 900 | 1210 | n.d. | 15 | 40 |

The steel sheets made of steels I1 or R2 (examples 16 and 17) have been resistance spot welded under alternating current of 60 Hz and an electrode force of 4.5 kN in different conditions according to Table X. Electrodes are positioned perpendicularly to the steel sheets.

by applying different values of intensity, it is possible to determine the suitable welding range defined by Imin which is the minimum intensity above which pullout failure is observed when the resistance spot weld is submitted to shear tensile test and Imax which is the intensity at which expulsion of liquid metal starts to be observed in resistance spot welding. The selection of intensity in industrial conditions is often made around this last value since it corresponds to a large weld nugget diameter which makes it possible to obtain high weld tensile properties. In the present case, welding has been performed at $I_{max}$ and slightly above in the expulsion domain, i.e. $I_{max}+10\%$. Although the welding with intensity comprised between $I_{max}$ and $I_{max}+10\%$ increases the LME susceptibility, this condition can be encountered in some cases in industrial practice.

The welding parameters are:

electrode tip diameter: 6 mm, welding force: 4.5 kN, welding time: 380 ms, cooling time: 0 ms, holding time: 300 ms.

By welding two or three sheets together and creating a stackup configuration, the sensitivity to LME cracking is higher with increased stackup thickness. Especially, for producing stackups of two layers, sheets 16 and 17 were welded to a galvanized DP980 steel, having the following composition: 0.1C-2.2Mn-0.3Si-0.3Mo-0.2Cr-0.01Nb-0.03Ti-0.001B, and having a thickness of 1.6 mm. For producing stackups of three layers, sheets 16 and 17 were welded to two galvanized sheets made of an extra deep drawing steel (with a tensile strength of 270 MPa) each having a thickness of 1.5 mm. These other steels are chosen because their spot welding needs higher current level to get proper welds than the steels of the present disclosure, having a tensile strength higher than 1180 MPa. This high current level induces high heat input and by consequence induces mores LME cracks during the welding of high resistance steels. Thus, the severity of the welding conditions is increased. Table X reports the total thickness of the stackups. In these stackups, the welding is performed in such a way that the steel sheet having a tensile strength higher than 1180 MPa (steel sheets of example 16 or 17) has one surface in contact with a welding electrode. The eventual cracks are more prone to occur in the indentation zone created by the welding electrode at the sheet surface.

TABLE X

| Welding Condition | No. of layers in the stackup | Stackup thickness (mm) | Welding intensity |
|---|---|---|---|
| a | 2 | 3.2 mm | $I_{max}$ and $I_{max}$ + 10%. |
| b | 3 | 4.6 mm | $I_{max}$ and $I_{max}$ + 10% |

The observation and the quantification of cracks due to LME have been performed in the following conditions: after half-cross sectioning and fine-polishing of 20 spot welds, ten of which being welded with $I=I_{max}$ and the other ten being welded with $I=I_{max}+10\%$, the weld sections have been observed through optical microscope with magnification between 10 and 1000, for example 200. The number of cracks having depth over 100 microns was measured for each spot weld, and the average number of LME cracks deeper than 100 μm per spot weld has been calculated over each series of 10 spot welds. Besides, for each series of 10 spot welds produced under the same conditions, the maximal crack size higher than 100 μm has been determined.

For stackups of two layers, high resistance to LME cracking is obtained when the average number of cracks having depth over 100 microns is less than 0.1 in the case of welding with $I=I_{max}$ or $I_{max}+10\%$.

For stackups of three layers, high resistance to LME cracking is obtained when the average number of cracks having depth over 100 microns is less than 2 in the case of welding with $I=I_{max}$ or when the average number of cracks is less than 4 in the case of welding with $I_{max}+10\%$.

Table XI shows the intensity Imax, the average LME cracks number determined in the welding conditions of $I_{max}$ or $I_{max}+10\%$ and the maximal size of the cracks having a size greater than 100 μm.

TABLE XI

| Weld | Imax (kA) | Average number of cracks/weld (>100 μm) at $I_{max}$ | Average number of cracks/weld (>100 μm) at $I_{max}$ 10% |
|---|---|---|---|
| 16a | 8.1 | 0 | 0 |
| 17a | 7.8 | 0.3 | 0.8 |
| 16b | 10.1 | 1.8 | 3.9 |
| 17b | 9.8 | 5.8 | 5.1 |

In this Table, 16a designates steels sheets 16 welded under conditions a. The same applies for example 17a (sheet 17 welded under condition a), and by analogy to examples 16b and 17b.

Regarding the spot weldability, and as shown by the above example 2, the sheets according to the present disclosure have a low LME sensitivity. It means that which such steels it is possible to produce structures comprising resistance spot welds, such as car bodies, for which the probability of the number of cracks in the resistance spot welds is such that the mean value is less than 6 cracks per resistance spot weld and the probability to have less than 10 cracks is 98%.

In addition, as shown by the example above, the number of cracks with a size greater than 100 microns is highly reduced as compared to steel sheets of the state of the art.

In particular, a welded structure, including resistance spot weld, of at least two steel sheets, can be produced by producing a first steel sheet by a method according to the present disclosure, for example coated with Zn or a Zn alloy, providing a second steel sheet having a composition such that C+Si/10≤0.30% and Al≥6(C+Mn/10)−2.5%, and resistance spot welding the first steel sheet to the second steel sheet. The second steel sheet may for example be produced by a method according to the present disclosure, and may be coated with Zn or a Zn alloy.

Thus, a welded structure having a low LME sensitivity is obtained. For example, for such a welded structure comprising at least ten resistance spot welds, the mean number of cracks per resistance spot weld is less than 6.

For example, the welded structure can be produced by providing the first steel sheet and the second steel sheet, superposing partly the first steel sheet and the second steel sheet, applying an effort comprised between 3.5 and 5 kN by means of electrodes placed perpendicular to the superposed sheets and resistance spot welding the first and second steel sheets to produce at least 10 resistance spot welds, with an intensity comprised between Imax and 1.1 *Imax, Imax being the intensity at which expulsion of liquid metal starts to be observed in resistance spot welding said first coated steel sheet to said second steel sheet.

Especially, if the welded structure is a welded structure of only two sheets (first and second steel sheet), even if the steel sheets are welded under severe conditions, especially with an intensity comprised between $I_{max}$ and $I_{max}+10\%$, the average number of cracks in the resistance spot welds having depth over 100 microns is less than 0.1. Generally, over the ten resistance spot welds, none comprises a crack having a depth over 100 microns.

If the welded structure is a welded structure of three sheets, the third sheet having a composition such that C+Si/10≤0.30% and Al≥6(C+Mn/10)−2.5%, even if the steel sheets are welded under severe conditions, especially with an intensity comprised between $I_{max}$ and $I_{max}+10\%$, the average number of cracks in the resistance spot welds having depth over 100 microns is less than 4. Especially, if the intensity equals Imax, the average number of cracks having depth over 100 microns is less than 2.

The steel sheets optionally welded by resistance spot welding according to the present disclosure are used with profit for the manufacture of structural parts in motor vehicles since they offer high formability during the fabrication process and high energy absorption in case of collision. The resistance spot welds according to the present disclosure are also used with profit for the manufacture of structural parts in motor vehicles, since eventual initiation and propagation of cracks located in the welded zones are much reduced.

What is claimed is:

1. A method for producing a coated steel sheet having a yield strength of at least 800 MPa, a tensile strength of at least 1180 MPa, a total elongation according to ISO standard 6892-1 of at least 13% and a hole expansion ratio HER according to ISO standard 16630:2009 of at least 30%, the method comprising the following successive steps:
   providing a cold-rolled steel sheet made of a steel having a chemical composition containing by weight:

15% ≤C≤0.23%

1.4% ≤Mn≤2.6%, 0.6% ≤Si≤1.3% with C+Si/10≤0.30%, 0.4% ≤Al≤1.0%, with Al≥6(C+Mn/10)−2.5%, 0.010% ≤Nb≤0.035%, 0.1% ≤Mo≤0.5%, a remainder being Fe and unavoidable impurities,
annealing the cold-rolled steel sheet at an annealing temperature $T_A$ between 860° C. and lower than Ac3, so as to obtain an annealed steel sheet having a structure consisting of at least 90% of austenite and at least 2% of intercritical ferrite;
quenching the annealed steel sheet from the annealing temperature $T_A$ down to a quenching temperature QT between Ms-10° C. and Ms-60° C. at an average cooling rate Vc higher than 30° C./s, to obtain a quenched steel sheet;
heating the quenched steel sheet from the quenching temperature QT to a partitioning temperature PT between 410° C. and 470° C., and maintaining the steel sheet at the partitioning temperature PT for a partitioning time Pt between 60 s and 130 s,
hot-dip coating the steel sheet in a bath; and
cooling the steel sheet down to room temperature, to obtain a coated steel sheet having a microstructure comprising, in area fraction:
between 45% and 68% of martensite, the martensite comprising partitioned martensite and fresh martensite, between 85% and 95% of the martensite being partitioned martensite, the partitioned martensite having a C content of at most 0.45%,
between 10% and 15% of retained austenite,
between 2% and 10% of intercritical ferrite, and
between 20% and 30% of lower bainite.

2. The method according to claim 1, wherein the quenched steel sheet has, just before the heating to the partitioning temperature PT, a structure consisting of, in area fraction:
between 2% and 10% of intercritical ferrite,
at least 10% of retained austenite,
at least 38% of martensite,
at least 15% of lower bainite. and
at most 5% of transformation ferrite.

3. The method according to claim 1, wherein the providing the cold-rolled steel sheet comprises:
hot rolling a semi-product made of the chemical composition to obtain a hot rolled steel sheet,
coiling the hot-rolled steel sheet at a coiling temperature Tc between 400° C. and 750° C.,
performing a batch annealing at a batch annealing temperature $T_{HBA}$ between 500° C. and 700° C. for a batch annealing time between 2 and 6 days, and
cold rolling the hot-rolled steel sheet to obtain the cold-rolled steel sheet.

4. The method according to claim 1, wherein the cold-rolled steel sheet is maintained at the annealing temperature $T_A$ for an annealing time $t_A$ between 80 s and 180 s.

5. The method according to claim 1, wherein the annealing temperature $T_A$ is at most 880° C., so that the annealed steel sheet has a structure consisting of at least 90% of austenite and more than 5% of intercritical ferrite, and the microstructure of the coated steel sheet comprises more than 5% and at most 10% of intercritical ferrite.

6. The method according to claim 1, wherein the average cooling rate Vc between the annealing temperature $T_A$ and the quenching temperature QT is at least 50° C./s, so that the microstructure of the coated steel sheet consists of, in area fraction:

between 45% and 68% of martensite, the martensite consisting of partitioned martensite and fresh martensite, between 85% and 95% of the martensite being partitioned martensite, the partitioned martensite having a C content of at most 0.45%,
between 10% and 15% of retained austenite,
between 2% and 10% of intercritical ferrite, and
between 20% and 30% of lower bainite,
the total elongation being of at least 14%.

7. The method according to claim 6, wherein the average cooling rate Vc between the annealing temperature $T_A$ and the quenching temperature QT is at least 60° C./s, the total elongation is at least 14% and the tensile strength is at least 1250 MPa.

8. The method according to claim 1, wherein 0.6%≤ Si<1.0% and 0.7% ≤Al≤1.0%.

9. The method according to claim 1, wherein 0.17%≤ C≤0.21%.

10. The method according to claim 1, wherein 1.9%≤ Mn≤2.3%.

11. The method according to claim 1, wherein the coated steel sheet is coated with Zn or a Zn alloy.

12. A method of manufacture comprising:
manufacturing structural parts in motor vehicles using the coated steel sheet produced according to the method of claim 1.

13. A process for producing a resistance spot weld of at least two steel sheets, the process comprising:
producing a first coated steel sheet by the method according to claim 1;
providing a second steel sheet having a composition such that C+Si/10≤0.30% and Al≥6(C+Mn/10)−2.5%; and
resistance spot welding the first coated steel sheet to the second steel sheet.

14. A method of manufacture comprising:
manufacturing structural parts in motor vehicles using the resistance spot weld produced according to the method of claim 13.

15. A coated steel sheet made of a steel having a chemical composition containing by weight:

15% ≤C≤0.23%

1.4% ≤Mn≤2.6%, 0.6% ≤Si≤1.3% with C+Si/10≤0.30%, 0.4% ≤Al≤1.0%, with Al≥6(C+Mn/10)−2.5%, 0.010% ≤Nb≤0.035%, 0.1% ≤Mo≤0.5%, a remainder being Fe and unavoidable impurities,
the coated steel sheet having a microstructure comprising, in area fraction:
between 45% and 68% of martensite, the martensite comprising partitioned martensite and fresh martensite, between 85% and 95% of the martensite being partitioned martensite, the partitioned martensite having a C content of at most 0.45%,
between 10% and 15% of retained austenite,
between 2% and 10% of intercritical ferrite, and
between 20% and 30% of lower bainite.

16. The coated steel sheet according to claim 15, wherein the retained austenite has an average C content between 1.0% and 1.3%.

17. The coated steel sheet according to claim 15, wherein the microstructure of the coated steel sheet comprises more than 5% and at most 10% of intercritical ferrite.

18. The coated steel sheet according to claim 15, wherein 0.6% ≤Si<1.0% and 0.7% ≤Al≤1.0%.

19. The coated steel sheet according to claim 15, wherein 0.17% ≤C≤0.21%.

20. The coated steel sheet according to claim 15, wherein 1.9% ≤Mn≤2.3%.

21. The coated steel sheet according to claim 15, having a yield strength of at least 800 MPa, a tensile strength of at least 1180 MPa, a total elongation according to ISO 6892-1 of at least 13% and a hole expansion ratio according to ISO 16630:2009 HER of at least 30%.

22. The coated steel sheet according to claim 15, wherein the coated steel sheet is coated with Zn or a Zn alloy, the coating resulting from a coating at a temperature less than 480° C.

23. The coated steel sheet according to claim 15, wherein the microstructure consists of, in area fraction:
  between 45% and 68% of martensite, the martensite consisting of partitioned martensite and fresh martensite, between 85% and 95% of the martensite being partitioned martensite, the partitioned martensite having a C content of at most 0.45%,
  between 10% and 15% of retained austenite,
  between 2% and 10% of intercritical ferrite,
  between 20% and 30% of lower bainite, and
  at most 5% of transformation ferrite.

24. The coated steel sheet according to claim 15, wherein the microstructure consists of, in area fraction:
  between 45% and 68% of martensite, the martensite consisting of partitioned martensite and fresh martensite, between 85% and 95% of the martensite being partitioned martensite, the partitioned martensite having a C content of at most 0.45%,
  between 10% and 15% of retained austenite,
  between 2% and 10% of intercritical ferrite, and
  between 20% and 30% of lower bainite.

25. A method of manufacture comprising:
  manufacturing structural parts in motor vehicles using the coated steel sheet according to claim 15.

26. A welded structure comprising:
  at least ten resistance spot welds of at least a first steel sheet and a second steel sheet, the first steel sheet and the second steel sheet each being the coated steel sheet according to claim 15, the welded structure having a mean number of cracks per resistance spot weld of less than 6.

27. A welded structure comprising:
  at least ten resistance spot welds of at least a first steel sheet and a second steel sheet, the first steel sheet being the coated steel sheet according to claim 15, the second steel sheet having a composition such that C+Si/10≤0.30% and Al≥6(C+Mn/10)−2.5%, and the welded structure having a mean number of cracks per resistance spot weld of less than 6.

28. The welded structure according to claim 27, wherein the welded structure is a welded structure of the first steel sheet, the second steel sheet and a third steel sheet having a composition such that C+Si/10≤0.30% and Al≥6(C+Mn/10)−2.5%, and wherein an average number of cracks having a depth over 100 microns in the at least ten resistance spot welds is less than 4.

29. The welded structure according to claim 27, wherein the welded structure is a welded structure of two sheets, consisting of the first steel sheet and the second steel sheet, and an average number of cracks having a depth over 100 microns in the at least ten resistance spot welds is less than 0.1.

30. A process for producing the welded structure according to claim 29, comprising:
  providing the first steel sheet and the second steel sheet;
  superposing partly the first steel sheet and the second steel sheet;
  applying an effort between 3.5 and 5 kN by means of electrodes placed perpendicular to the first and second steel sheets; and
  resistance spot welding the first and second steel sheets to produce at least 10 resistance spot welds, with an intensity between Imax and 1.1*Imax, Imax being an intensity at which expulsion of liquid metal starts to be observed in resistance spot welding the first steel sheet to the second steel sheet.

31. A method of manufacture comprising:
  manufacturing structural parts in motor vehicles using the welded structure according to claim 27.

* * * * *